J. J. BOTTEN.
SHINGLE TRUCK.
APPLICATION FILED OCT. 8, 1910.

993,341.

Patented May 30, 1911.

2 SHEETS—SHEET 1.

Witnesses.
Harry Opsahl.
E. C. Skinkle.

Inventor.
J. J. Botten
By his Attorneys.
Williamson & Merchant

J. J. BOTTEN.
SHINGLE TRUCK.
APPLICATION FILED OCT. 8, 1910.

993,341.

Patented May 30, 1911.

2 SHEETS—SHEET 2.

Witnesses.
Harry Opsahl.
E. C. Skinkle

Inventor.
J. J. Botten
By his Attorneys

UNITED STATES PATENT OFFICE.

JOHN J. BOTTEN, OF ALCESTER, SOUTH DAKOTA.

SHINGLE-TRUCK.

993,341.

Specification of Letters Patent.  Patented May 30, 1911.

Application filed October 8, 1910. Serial No. 585,964.

*To all whom it may concern:*

Be it known that I, JOHN J. BOTTEN, a citizen of the United States, residing at Alcester, in the county of Union and State of South Dakota, have invented certain new and useful Improvements in Shingle-Trucks; and I do hereby declare the following to be a full, clear, and exact description of the invention, such as will enable others skilled in the art to which it appertains to make and use the same.

My invention has for its object to provide an improved shingle truck and, to this end, the invention consists of the novel devices and combinations of devices hereinafter described and defined in the claims.

In the accompanying drawings which illustrate the invention, like characters indicate like parts throughout the several views.

Figure 1:
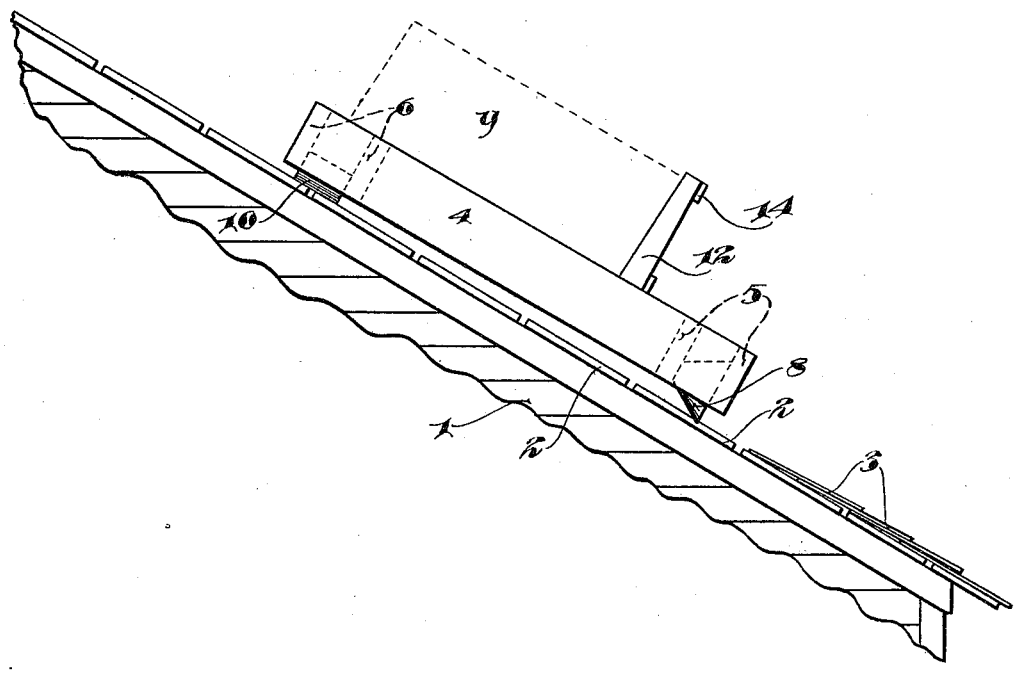
Figure 2:
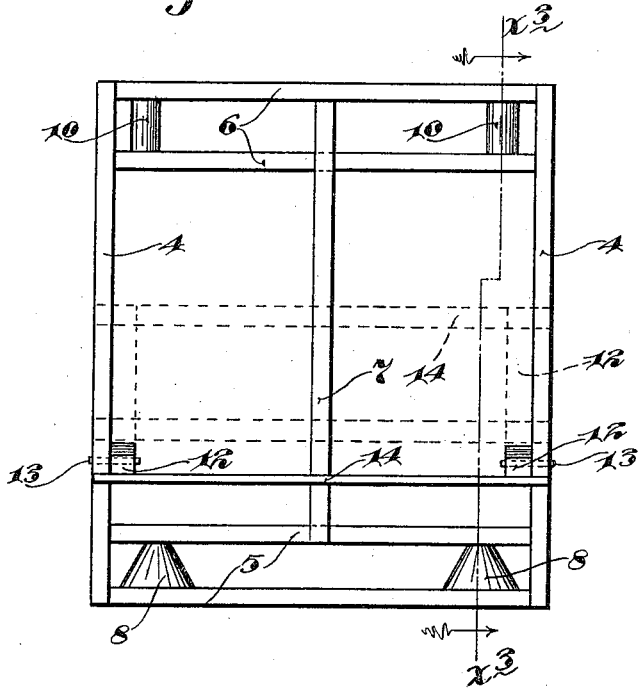
Figure 3:
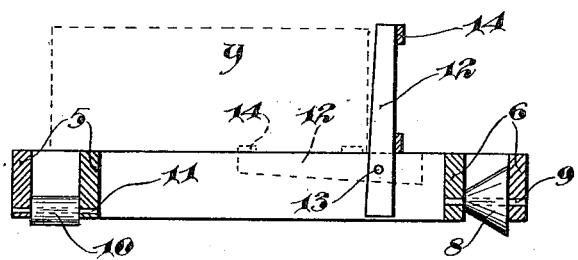

Referring to the drawings, Figure 1 is a view in side elevation, showing the improved truck mounted in working position on the roof of a building and having indicated thereon, by means of dotted lines, a bunch of shingles; Fig. 2 is a plan view of the improved truck with its pivoted back shown folded into an inoperative position by means of dotted lines; and Fig. 3 is a longitudinal section taken on the line $x^3 x^3$ of Fig. 2.

For the purpose of illustrating the improved truck in working position, a portion of a building is shown in Fig. 1. The numerals 1, 2 and 3 indicate, respectively, a portion of one side of the building, the attached roof boards, and the laid shingles.

The truck platform is, as shown, preferably made rectangular in form and comprises a skeleton frame made up of a pair of laterally spaced end bars 4 connected at their lower ends by means of a pair of laterally spaced side bars 5 and having their upper ends connected by means of a pair of laterally spaced side bars 6. For the purpose of further strengthening the frame and for supporting the inner ends of the shingles, an intermediate tie bar 7 is secured to and countersunk into the inner end bar 5 and the two end bars 6.

Mounted between the side bars 5, and located one in advance of the other, is a pair of conical sharp-edged truck wheels 8, each having oppositely projecting trunnions 9 journaled in the side bars 5. These conical truck wheels 8 taper from their outer toward their inner sides and their sharp peripheral edges cut into the roof boards 2, as shown in Fig. 1, and thereby prevent the truck from slipping on the roof and hold the truck for endwise movement lengthwise of the roof boards 2. Between the side bars 6 are mounted a pair of wide faced truck wheels 10, each having oppositely projecting trunnions 11 journaled in the side bars 6. These truck wheels 10 are of such width as to prevent the same from dropping into the cracks between the roof boards 2.

As shown in Figs. 1 and 3, a bunch of shingles Y is indicated by dotted lines on the truck. To hold the shingles Y in positions on the truck and prevent the same from falling off, a folding skeleton back is pivotally secured near the front of the truck platform and extends from end to end thereof. The folding back is, as shown, preferably made up of a pair of posts 12 pivotally secured at 13, near their lower end, one to the inner face of each of the end bars 4. These posts 12 are connected by means of horizontal and laterally spaced bars 14. The ends of the bars 14 project beyond the posts 12 and form stops to limit the opening and closing movements of the folding back. When the improved truck is not in use, the back may be folded into an inoperative position, as indicated by dotted lines in Fig. 3.

As before stated, the improved shingle truck is placed on the roof so as to travel lengthwise of the roof boards and just above the last row of laid shingles and, as is evident, the truck may be moved back and forth along the roof just in advance of the workman, thereby always keeping the loose shingles together and within easy reach of the workman.

What I claim is:

1. In a shingle truck, the combination with a platform, of truck wheels journaled to said platform, the wheels on one side of said truck frame having sharp edges and the wheels on the other side thereof having wide faces and a folding back pivotally secured to said platform, substantially as described.

2. In a shingle truck, the combination with a platform, of truck wheels journaled to said platform, the said wheels on one side of said platform being conical in form and having sharp edges, and a folding back pivotally secured to said platform, substantially as described.

In testimony whereof I affix my signature in presence of two witnesses.

JOHN J. BOTTEN.

Witnesses:
P. J. HEGUES,
H. J. MEIDELL.

Copies of this patent may be obtained for five cents each, by addressing the "Commissioner of Patents, Washington, D. C."